United States Patent [19]

Grigat et al.

[11] Patent Number: 5,455,311
[45] Date of Patent: Oct. 3, 1995

[54] THERMOPLASTIC BLOCK COPOLYESTERS CAPABLE OF BEING COMPOSTED FOR USE AS PACKAGING MATERIALS

[75] Inventors: Ernst Grigat, Leverkusen; Ralf Dujardin, Willich-Anrath; Ralf Timmermann, Krefeld; Hans-Georg Rast, Gladbach, all of Germany

[73] Assignee: Bayer AG, Leverkusen, Germany

[21] Appl. No.: 287,073

[22] Filed: Aug. 8, 1994

Related U.S. Application Data

[63] Continuation of Ser. No. 26,775, Mar. 5, 1993, abandoned.

[30] Foreign Application Priority Data

Mar. 16, 1992 [DE] Germany .............. 42 08 360.5

[51] Int. Cl.⁶ .............. C08G 81/00; C08G 63/64; C08G 69/44
[52] U.S. Cl. .............. 525/439; 525/466; 525/425; 525/440
[58] Field of Search .............. 525/439, 466; 528/176, 195

[56] References Cited

U.S. PATENT DOCUMENTS

| | | | |
|---|---|---|---|
| 3,161,615 | 12/1964 | Goldberg | 525/439 |
| 3,287,442 | 11/1966 | Caldwell et al. | 260/858 |
| 3,843,708 | 10/1974 | Matzner | 260/463 |
| 4,129,715 | 12/1978 | Chen | 528/51 |
| 4,169,868 | 10/1979 | Schreckenberg et al. | 525/439 |

FOREIGN PATENT DOCUMENTS

| | | |
|---|---|---|
| 2393823 | 1/1979 | France . |
| 1961996 | 7/1970 | Germany . |
| 119594 | 9/1979 | Japan .............. 525/425 |
| 119595 | 9/1979 | Japan .............. 525/425 |
| 1139412 | 1/1969 | United Kingdom .......... 525/439 |
| WO9102015 | 2/1991 | WIPO . |

OTHER PUBLICATIONS

Merrill, "Block Copolymers Based on 2,2-bis(4-Hydroxyphenyl)-propane Polycarbonate" Journal of Polymer Science, vol. 55, pp. 343–352 (1961).

Allport et al., "Property–Structure Relationships in Polyurethane Block Copolymers", Block Copolymers, Applied Science Publishers, Ltd, pp. 442–492 (1973).

Patent abstracts of Japan, vol. 003, No. 142 (C–065), Nov. 24, 1979 and JP-A-54119594 (Kogyo Gijutsuin) Sep. 17, 1979.

Primary Examiner—David Buttner
Attorney, Agent, or Firm—Connolly & Hutz

[57] ABSTRACT

The object of the present invention is the production of thermoplastically workable copolymers capable of being composted, characterized in that they consist of partially crystalline soft segments formed from aliphatic esters and also of amorphous hard segments and that the proportion of soft segments amounts to 70% to 95% by weight.

2 Claims, No Drawings

THERMOPLASTIC BLOCK COPOLYESTERS CAPABLE OF BEING COMPOSTED FOR USE AS PACKAGING MATERIALS

This application is a continuation of application Ser. No. 08/026,775 filed on Mar. 5, 1993, which is now abandoned.

The object of the present invention is the production of thermoplastically workable copolymers capable of being composted, characterised in that they consist of partially crystalline soft segments formed from aliphatic esters with a melting-range between 30° C. and 200° C., preferably between 40° C. and 120° C., and also of amorphous hard segments, and the soft segments make up a proportion from 70% by weight to 95% by weight, preferably 75% by weight to 85% by weight, relative to the total amount, the copolymers according to the invention having an average molecular weight (Mw, determined by gel chromatography in m-cresol, using polystyrene as standard) of 15,000 to 1,000,000, and preferably 25,000 to 400,000, and that 1 g of the copolymer according to the invention in 250 ml ASTM nutrient salt solution with a pH value of 6.8, inoculated with 2 ml of an extract of garden compost and subject to swirling at 220 rpm at 37° C. with admission of air, gives rise within at most two weeks to the growth of at least 30 mg/l of biomass and preferably under the same conditions exhibits within at most four weeks a weight loss of at least 15% by weight.

The structure of thermoplastic elastomers is described in the specialist literature as "the simultaneous presence of soft and elastic segments having high extensibility and low second-order transition temperature ($T_G$ value) and of hard segments capable of being crystallised and having low extensibility, high $T_G$ value and the tendency to form complexes (crosslinking)" (trans. from W. Hofmann, "Thermoplastische Elastomere—Stoffklassen und Versuch einer Klassifikation", Kunststoffe 77 (1987) 767 to 776).

Purely aliphatic biologically degradable poly(ester carbonates) are known, but their production is costly. They are described as being used exclusively as surgical suture material, their compostibility is not addressed (B. C. Benicewicz, P. K. Hopper, J. Bioact. Comp. Polym. 6 (1991) 64; U.S. Pat. No. 4,429,080).

Biologically degradable poly(ester amides) formed from lactic acid, diamines and dicarboxylic acid dichlorides (U.S. Pat. Nos. 4,343,931; 4,529,792) or from caprolactone and caprolactam (Jap. Pat. 79 119 593, Jap. Pat. 79 119 594) are equally well-known. They are, however, expensive to produce.

The biological degradability of aliphatic polyesters of dicarboxylic acids and dialcohols is also well-known (see, for example, EP 0 452 111). These are also very costly to produce. The technical characteristics of products manufactured in this way are not particularly advantageous.

Production of poly(ester amides) by reaction of acid-terminated aliphatic ester prepolymers with aromatic diisocyanates is well-known (see, for example, U.S. Pat. No. 4,129,715, EP 0 275 988). Biological degradability of these materials is not mentioned.

The reaction of aliphatic hydroxyl-terminated ester prepolymers with polycarbonates to form ester carbonate precondensates (see, for example, DE 3 529 984) or poly(ester carbonates) having 5% by weight to 70% by weight of ester is well-known (see, for example, DE 2 726 417 or EP 0 127 842). The materials resulting therefrom do not, however, correspond to the physical structure described in this invention, as they contain partially crystalline hard segments with a melting-temperature between 160° C. and 250° C. (partial crystallinity is described in detail in DE 2 636 783. Biodegradability of the materials resulting therefrom is not addressed. Moreover, crystalline segments of high melting-point greatly hinder good biodegradability (S. J. Huang, Biodegradable Polymers in: Encyclopedia of Polymer Science and Engineering, 2nd Ed., Vol. 2, 223, Wiley & Sons, New York 1988).

Quite surprisingly it has been possible to synthesise copolyesters containing a high proportion of aliphatic esters which by virtue of their hardness and morphology have to be described as thermoplastic elastomers but-which contradict the definition stated above (W Hofmann, "Thermoplastische Elastomere—Stoffklassen und Versuch einer Klassifikation", Kunststoffe 77 (1987) 767 to 776) as regards their crystalline hard segments. This was achieved by the use of amorphous hard segments, such as aromatic carbonates, which are known to be amorphous (D. Freitag, U. Grigo, P. R. Müller, W. Nouvertne: Polycarbonates in: Encyclopedia of Polymer Science and Engineering, 2nd Ed., Vol. 11, 655, Wiley & Sons, New York 1988).

Not foreseeable, and new in comparison with the known systems richer in carbonate [DE 2 636 783], is the disappearance of the carbonate second-order transition temperature above 150° C. with simultaneous retention of phase separation.

Equally surprising and not foreseeable with regard to the known systems richer in carbonate [DE 2 636 783] is the appearance of a finely crystalline structure which is responsible for the comparatively high stability of the copolymers according to the invention. In contrast to the known systems richer in carbonate which have 40% by weight of carbonate segments, the coarser dendrite structure of which is no longer formed after a molten sample is cooled, this stabilising finely crystalline structure is retained even on cooling. Systems still richer in carbonate (60% by weight of carbonate segments) are amorphous. The crystalline portions of the copoly(ester carbonates) according to the invention consist of aliphatic ester segments, whereas the amorphous portions can consist of ester segments or of carbonate segments. There is no directional preference, so that constant stability is ensured in all directions.

The ester segments of the copolymers according to the invention can, according to the hard segment or production process to be used, consist of at least one of the following types of compound:

1. Oligoesters with several, preferably two, COOH terminal groups with Mn (number average) ranging from 600 to 2000, and preferably 800 to 1300, which have for example been produced by reactions known from the literature, such as melt condensation in the presence of catalysts, or preferably without catalysts, of polyvalent, preferably divalent, if necessary supplemented by trivalent, alcohols with polyvalent, preferably divalent, if necessary supplemented by trivalent, carboxylic acids. Instead of the free carboxylic acids, the corresponding carboxylic acid chlorides, carboxylic acid anhydrides or carboxylic acid esters of lower alcohols can also be used to produce these oligoesters.

The polyvalent alcohols can be of aliphatic or cycloaliphatic type, preferably linear aliphatic. Some examples are: ethylene glycol, propylene glycol-1,3, butanediol-1,4, pentanediol-1,5 and hexanediol-1,6.

The polyvalent dicarboxylic acids can be of aliphatic or cycloaliphatic type, preferably linear aliphatic. Some examples are: succinic acid, suberic acid, azelaic acid, sebacic acid and, preferably, adipic acid.

By the choice of the defined acid excess the content of carboxyl terminal groups and thereby the 'average molecular weight' is adjusted. This can be ascertained by determining the 'acid-number'.

2. Oligoesters with several, preferably two, hydroxyl terminal groups with Mn (number average) ranging from 1000 to 4000, and preferably 1800 to 2800, which have for example been produced by reactions known from the literature, such as melt condensation in the presence of catalysts, such as titanium tetrabutylate, of polyvalent, preferably divalent, if necessary supplemented by trivalent, alcohols with polyvalent, preferably divalent, if necessary supplemented by trivalent, carboxylic acids.

Instead of the free carboxylic acids, the corresponding carboxylic acid chlorides, carboxylic acid anhydrides or carboxylic acid esters of lower alcohols can also be used to produce these oligoesters.

The polyvalent alcohols can be of aliphatic or cycloaliphatic type, preferably linear aliphatic. Some examples are: ethylene glycol, propylene glycol-1,3, pentanediol-1,5 and, preferably, butanediol-1,4 and hexanediol-1,6.

The polyvalent dicarboxylic acids can be of aliphatic or cycloaliphatic type, preferably linear aliphatic. Some examples are: succinic acid, suberic acid, azelaic acid, sebacic acid and, preferably, adipic acid.

By the choice of the defined alcohol excess the content of hydroxyl terminal groups and thereby the 'average molecular weight' is adjusted. This can be ascertained by determining the 'OH number'.

The hard segments of the copolymers according to the invention can consist, for example, of at least one of the following types of compound:

1. Oligocarbonate segments formed from carbonate donors and diphenols. Suitable diphenols are those known from polycarbonate chemistry and listed, for example, in DE 2 636 783 and preferably as regards compostibility those which are free from halogens, such as bis(hydroxyphenyl)/alkanes, in particular 2,2-bis(4-hydroxyphenyl)propane, or bis(hydroxyphenyl) cycloalkanes such as 1,1-bis(4-hydroxyphenyl)- 3,3,5-trimethylcyclohexane. Suitable carbonate donors are also those known from polycarbonate chemistry, preferably diphenyl carbonate or phosgene.

2. Amide segments formed from acid terminal groups of the oligoesters by reaction with aliphatic or cycloaliphatic isocyanates that are multiply, preferably doubly, functionalised and which can have a molecular weight of up to 1000, but preferably dicyclohexylmethane-4,4'-diisocyanate or (3-isocyanatomethyl-3,5,5-trimethyl)cyclohexylisocyanate or, in particular, hexamethylene diisocyanate.

Instead of the isocyanates themselves, the appropriate compounds which release isocyanates, such as reversibly cleavable derivatives of the isocyanates (for example, the urethanes with low monoalcohols) can also be used.

The characteristic of compostibility according to the invention is defined as follows:

The polymers to be tested are incubated in a liquid medium according to ASTM G22 (composition given in Table 1) with a mixture of microorganisms from garden compost, subject to swirling (220 rpm) and admission of air at 37° C. In addition, about 1 g of the polymer in 250 ml of nutrient salt solution in 1-liter Erlenmeyer flasks is inoculated in several plots, each having an area of one square centimeter, with 2 ml of a suspension of 10 g of garden compost in 100 ml of nutrient salt solution. Large particles are removed from the compost suspension beforehand by using a fine sieve. The dry-substance (DS) content of the inoculated matter then amounts to about 50 mg. By way of control for measuring the abiotic weight loss of the polymer sample, a deposit of $HgCl_2$ (500 mg/l) is added. Other control deposits contain cellulose (4 g/l, type DP 500, manufactured by Wolff Walsrode) for checking the growth with a natural substrate or are deposited without the addition of a carbon source in order to determine the background growth and the decrease in DS of the inoculum.

TABLE 1

Composition of the nutrient salt solution according to ASTM G22

TABLE 1

| Composition of the nutrient salt solution according to ASTM G22 | |
|---|---|
| $KH_2PO_4$ | 0.7 g |
| $K_2HPO_4$ | 0.7 g |
| $MgSO_4.7H_2O$ | 0.7 g |
| $NH_4NO_3$ | 1.0 g |
| NaCl | 0.005 g |
| $FeSO_4.7H_2O$ | 0.002 g |
| $ZnSO_4.7H_2O$ | 0.002 g |
| $MnSO_4.H_2O$ | 0.001 g |
| $H_2O$ distilled | 1000.0 ml |

To determine the DS content of the portions that are insoluble in water (polymers or polymer residues, biomass and inoculum) the complete contents of a flask are centrifugated, washed once in 0.05 m phosphate buffer, and the insoluble residue is dried at 80° C. for at least 48 h. The biomass and the pure inoculum are determined in parallel flasks. By subtracting these measured quantities the proportion of the polymer residues can be calculated.

To measure the biomass, the complete contents of a flask are processed in like manner. Here use is made of a modification of the process for determining adenosine triphosphate (ATP) developed by the company Lumac-3M: 10 minutes after adding the reagent (Lumac) there are added 2.5 ml of a 33% tetrabutylammonium hydroxide solution. This leads to complete liberation of ATP from the entire biomass within 30 seconds. After this time the ATP content can be determined by the conventional luciferine/luciferase reaction according to data supplied by Lumac. In order to correlate the ATP content with the dry substance, a 24-h culture of *Kl. planticola* is also measured, the ATP/DS ratio of which is determined in advance.

Samples described as highly compostible in the sense of the invention are those which under the conditions stated above facilitate a growth in biomass on the polymer of at least 30 mg/l within a maximum of two weeks.

Not compostible in the sense of the invention are samples which under the conditions stated above facilitate a growth in biomass of at most 5 mg/l within a maximum of two weeks.

From the multitude of compostible products according to the invention particularly suitable are copoly(ester carbonates) consisting of 75% by weight to 85% by weight of ester segments formed from hydroxyl-terminated aliphatic esters with an average molecular weight (Mn, ascertained by determining the OH-number) of 1500 to 3000, which preferably can again be produced from adipic acid and butanediol and/or hexanediol, and 15% by weight to 25% by weight of carbonate segments which can be produced from diphenols such as bis(hydroxyphenyl) alkanes, in particular 2,2-bis(4-hydroxyphenyl)-propane, or bis(hydroxyphenyl) cycloalkanes such a 1,1-bis(4-hydroxyphenyl)- 3,3,5-trimethylcyclohexane, and carbonate donors.

The OH-numbers of the hydroxyl-terminated aliphatic esters which can be used according to the invention are determined by acylation with acetic anhydride in pyridine and back titration of the acetic acid arising and of the anhydride excess with NaOH.

These copolyester carbonates are new.

A further object of the present invention is consequently the production of copolyester carbonates, characterised in that they consist of 75% by weight to 85% by weight of ester segments formed from hydroxyl-terminated aliphatic esters with an average molecular weight ($\bar{M}n$, ascertained by determining the OH-number) of 1500 to 3000, which preferably are again produced from adipic acid and butanediol-1,4 and/or hexanediol-1,6, and 15% by weight to 25% by weight of carbonate segments which can be produced from diphenols such as bis(hydroxyphenyl) alkanes, in particular 2,2-bis(4-hydroxyphenyl)-propane, or bis(hydroxyphenyl) cycloalkanes such as 1,1-bis(4-hydroxyphenyl)- 3,3,5-trimethylcyclohexane, and carbonate donors.

The precondensates to these copoly(ester carbonates) according to the invention can, for example, be produced in known manner (DE 3 529 984) by transesterification of the hydroxyl-terminated oligoesters with polycarbonate with the aid of catalytic quantities of base. Condensation to the copoly(ester carbonates) according to the invention can, for example, be effected by the equally well-known phase interface process such as is adopted for homopolycarbonate.

From the multitude of compostible products according to the invention particularly suitable are copoly(ester amides), characterised in that they can be produced from ester segments formed from carboxyl-terminated aliphatic esters with an average molecular weight ($\bar{M}n$, ascertained by determining the acid-number) from 600 to 2000, which in turn can be produced from polyvalent, preferably divalent, cycloaliphatic or aliphatic, preferably linear aliphatic carboxylic acids such as, preferably, adipic acid or sebacic acid, and from polyvalent, preferably divalent, cycloaliphatic or aliphatic, preferably linear aliphatic alcohols such as, preferably, cyclohexanedimethanol, ethylene glycol, propylene glycol-1,3, butanediol-1,4, pentanediol-1,5 and/or hexanediol-1,6, and from aliphatic and/or cycloaliphatic diisocyanates, preferably hexamethylene diisocyanate, if necessary in a mixture with polyvalent isocyanates, for example in a melt. Instead of the isocyanates themselves, the appropriate compounds which release isocyanates can also be used, such as reversibly cleavable derivatives of the isocyanates (for example, the urethanes with low monoalcohols). These products are also new.

A further object of the present invention is consequently the production of copoly(ester amides), characterised in that they consist of ester segments formed from carboxyl-terminated aliphatic esters with an average molecular weight ($\bar{M}n$, ascertained by determining the acid-number) of 600 to 2000, which in turn are produced from polyvalent, preferably divalent, cycloaliphatic or aliphatic, preferably linear aliphatic carboxylic acids such as, preferably, adipic acid or sebacic acid, and polyvalent, preferably divalent, cycloaliphatic or aliphatic, preferably linear aliphatic alcohols such as, preferably, cyclohexanedimethanol, ethylene glycol, propylene glycol-1,3, butanediol-1,4, pentanediol-1,5 and/or hexanediol-1,6, and from aliphatic and/or cycloaliphatic diisocyanates, preferably hexamethylene diisocyanate, if necessary in a mixture with polyvalent isocyanates, for example in a melt.

Instead of the isocyanates themselves, the appropriate compounds which release isocyanates can also be used, such as reversibly cleavable derivatives of the isocyanates (for example, the urethanes with low monoalcohols).

Both the compostible thermoplastically workable synthetic substances according to the invention and the new poly(ester carbonates) or poly(ester amides) themselves can if necessary be treated with conventional additives such as plasticisers, modifiers for impact resistance, flameproofing agents, hydrophobing agents, nucleating agents and/or other agents, wherein care should be taken so as not to impair the compostibility of the compostible materials.

Both the compostible thermoplastically workable synthetic substances according to the invention and the new poly(ester carbonates) or poly(ester amides) themselves can, on their own or mixed with the stated additives, be filled with conventional fillers, wherein care should again be taken so as not to impair the compostibility of the compostible materials.

The copolymers according to the invention can, for example, be processed into films and be used more advantageously as compostible rubbish bags or milk foils. They can also, for example, be injection-moulded conventionally to form moulded bodies which can be composted after use.

The new poly(ester carbonates) can, for example, be processed into cast films in known manner, the new poly(ester amides) can, for example, be sprayed to form arbitrary moulded bodies which can, for example, be used as covers for grave lights, as handle-grips or as hosepipe connections.

The new poly(ester amides) can, according to the mode of reaction, also be produced as soft foam bodies. These can be used advantageously as compostible insulating material or filler material, for example for packaging purposes.

Thus a further object of the present invention are films, thermoforming goods, moulded bodies and foams produced from the copolymers, copolyester carbonates respectively copolyester amides according to instant invention.

EXAMPLES

EXAMPLE 1

100.3 g of an oligoester formed from ethylene glycol and adipic acid in a molar ratio of 5:6 with an acid-number of 123 are heated to 200° C. in a nitrogen atmosphere. To this there are added 19.1 g hexamethylene diisocyanate in such a manner that the $CO_2$ evolved can escape. After addition is complete the mixture is stirred for a further 15 minutes and the deposit is poured into a suitable shape to cool.

A material is obtained having a relative viscosity (0.5% in m-cresol) of $\eta_{rel}$=1,188, which at 150° C. to 160° C. can be processed to form injection-moulded bodies.

The growth in biomass after two weeks under the conditions described in the text amounted to 152 mg/l. The loss of mass under the same conditions within four weeks amounted to 84% by weight.

EXAMPLE 2

To 132.7 g of a melt of an oligoester formed from cyclohexane-1,4-dimethanol and adipic acid with an acid-number of 76.1 (determined by KOH/methanol titration) and stirred at 200° C. in an atmosphere of nitrogen there are added dropwise 15.4 g hexamethylene diisocyanate in such a manner that the carbon dioxide evolving can easily escape. When all the isocyanate has been added, stirring is effected for another 60 minutes and the deposit is then poured out into a dish.

The polyester amide is obtained as a solid white mass with a second-order transition temperature of 38.6° C. (first heating) or 32.8° C. (second heating) and crystallite melting-temperatures of 97° C. and 93° C. respectively (first/second heating; all figures according to DSC) and a decomposition temperature of over 400° C. (TGA) The relative viscosity is 1.148 (0.5% in m-cresol).

EXAMPLE 3

70.2 g of an oligoester formed from adipic acid, trimethylolpropane and ethylene glycol (molar ratio 6:1:3.5) with an acid-number of 111.8 (determined by KOH/methanol titration) are reacted in a melt with 11.8 g hexamethylene diisocyanate. A soft, colourless, open-pored foam is obtained.

EXAMPLE 4

In a nitrogen atmosphere 157.5 g of an oligoester formed from hexanediol-1,6 and adipic acid with an acid-number of 85.5 (determined by KOH/methanol titration) and 38.8 g hexamethylene-1,6-bis(tert-butylurethane), obtained by reacting hexamethylene diisocyanate with tert.-butanol, are heated in such a way that the carbon dioxide and tert.-butanol evolved can easily escape. When a temperature of 200° C. is reached, stirring is continued for 60 minutes and the deposit is then poured out into a dish.

The poly(ester amide) is obtained as a solid mass with a second-order transition temperature of 20° C. and a crystallite melting-temperature of 135 ° C. ( figures according to DSC) as well as a decomposition temperature of over 400° C. (TGA in air).

EXAMPLE 5a

To 3.6 kg of an oligoester formed from adipic acid and hexanediol with an OH-number of 54 (determined by the acetic anhydride method) and 15.3 kg chlorobenzene there are added 0.9 kg bisphenol A polycarbonate having $\eta_{rel}$= 1.57 (0.5% in dichloromethane) and 0.0018 kg disodium bisphenolate A, the mixture is stirred for 8 hours until reflux occurs and is then allowed to cool.

EXAMPLE 5b

To 13.8 kg of the solution from Example 5a there are added 1.6 kg of 45% caustic-soda solution, 17.1 kg water and 37.0 kg dichloromethane and, with stirring, 0.522 kg phosgene is introduced into the mixture. After all the phosgene has been introduced, 5.4 ml N-ethylpiperidine are added and stirring is effected for 1 hour. If necessary the solution should be diluted during this stirring with up to 9 l chlorobenzene and up to 20 l dichloromethane. After stirring, the solution is acidified and washed free of electrolyte with water. Drying is effected on a single-screw extruder at 230° C. and 50 rpm.

A colourless material is obtained having $\eta_{rel}$=1.89 (0.5% in dichloromethane). The growth in biomass after two weeks under the conditions described in the text amounted to 274 mg/l. The loss of mass under the same conditions amounted within four weeks to 37% by weight.

EXAMPLE 6a

To 120 g of an oligoester of adipic acid and hexanediol with an OH-number of 54 (determined by the acetic anhydride method) and 425 g chlorobenzene there are added 30 g of a polycarbonate formed from 1,1-bis(4-hydroxyphenyl)- 3,3,5-trimethylcyclohexane having $\eta_{rel}$=1.29 (0.5% in dichloromethane) and 0.125 g disodium bisphenolate A, the mixture is subjected to stirring for eight hours until reflux occurs and the solvent is then removed.

EXAMPLE 6b

To 50.0 g of the product from Example 6a there are added 500 ml dichloromethane and the solution of 8.0 g sodium hydroxide in 200 ml water, and 5.8 g phosgene are introduced, with stirring, into the mixture. After all the phosgene has been introduced, 0.06 ml N-ethylpiperidine are added and stirring is effected for 1 hour.

After stirring, the solution is acidified, washed neutral with water, dried and evaporated.

A colourless material is obtained having $\eta_{rel}$=1.91 (0.5% in dichloromethane).

We claim:

1. Copolyester carbonates, characterized in that they consist of 75% by weight to 85% by weight of ester segments and from 15% by weight to 25% by weight of carbonate segments, wherein said ester segments are formed from hydroxyl-terminated aliphatic esters having an average molecular weight (Mn, ascertained by determining the OH-number) of 1500 to 3000 which are derived from adipic acid and at least one of butanediol-1,4 and hexanediol-1,6, and further wherein said carbonate segments are produced from diphenols and carbonate donors, said copolyester carbonates being produced by a method which comprises forming precondensates to the copolyester carbonates by transesterification of said hydroxyl-terminated esters with polycarbonate with the aid of catalytic quantities of base and subsequently, condensing the precondensates to the copolyester carbonates by reacting said precondensates with diphenols and carbonate donors by a phase interface process.

2. Compostible films, thermoforming goods, moulded bodies or foams produced from the materials of claim 1.

\* \* \* \* \*